United States Patent [19]

Böhme et al.

[11] 4,449,404

[45] May 22, 1984

[54] THERMOELECTRIC LEVEL MEASURING DEVICE

[75] Inventors: Rolf Böhme, Bad Friedrichshall; Heinz Rinderle; Jürgen Sieber, both of Heilbronn, all of Fed. Rep. of Germany

[73] Assignee: Telefunken Electronic GmbH, Heilbronn, Fed. Rep. of Germany

[21] Appl. No.: 368,624

[22] Filed: Apr. 15, 1982

[30] Foreign Application Priority Data

Apr. 18, 1981 [DE] Fed. Rep. of Germany ....... 3115776

[51] Int. Cl.³ .............................................. G01F 23/24
[52] U.S. Cl. ..................................................... 73/295
[58] Field of Search ........................................... 73/295

[56] References Cited

U.S. PATENT DOCUMENTS 3,485,100  12/1969  Petersen .............................. 73/295
3,631,440  12/1971  Cliffgard .
4,299,126  11/1981  Heuwieser et al. .................. 73/295

FOREIGN PATENT DOCUMENTS 813968    9/1951   Fed. Rep. of Germany .
2032591   1/1971   Fed. Rep. of Germany .
2024911   12/1971  Fed. Rep. of Germany .
2423415   11/1975  Fed. Rep. of Germany ........ 73/295
2841889   3/1980   Fed. Rep. of Germany .
1256411   12/1971  United Kingdom ................. 73/295
540149    7/1977   U.S.S.R. .............................. 73/295

Primary Examiner—Gerald Goldberg
Assistant Examiner—Joseph W. Roskos
Attorney, Agent, or Firm—Spencer & Frank

[57] ABSTRACT

A thermoelectric level measuring device for measuring the fill level of a container having a filling material therein and a free space above the filling material comprises a series connection of three sensing resistors, the first of which is always surrounded by the filling material, the second of which is intended to be surrounded by the filling material and by the free space and the third of which is always located in the free space and an evaluation circuit connected to each end of the series connection and to the connection points between the sensing resistors.

15 Claims, 10 Drawing Figures

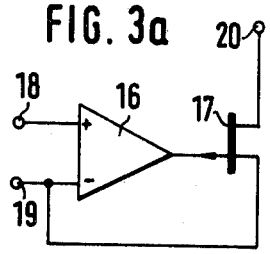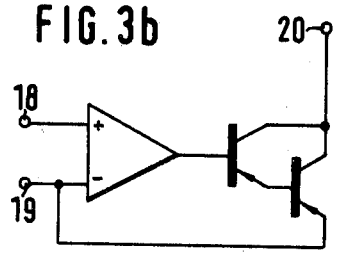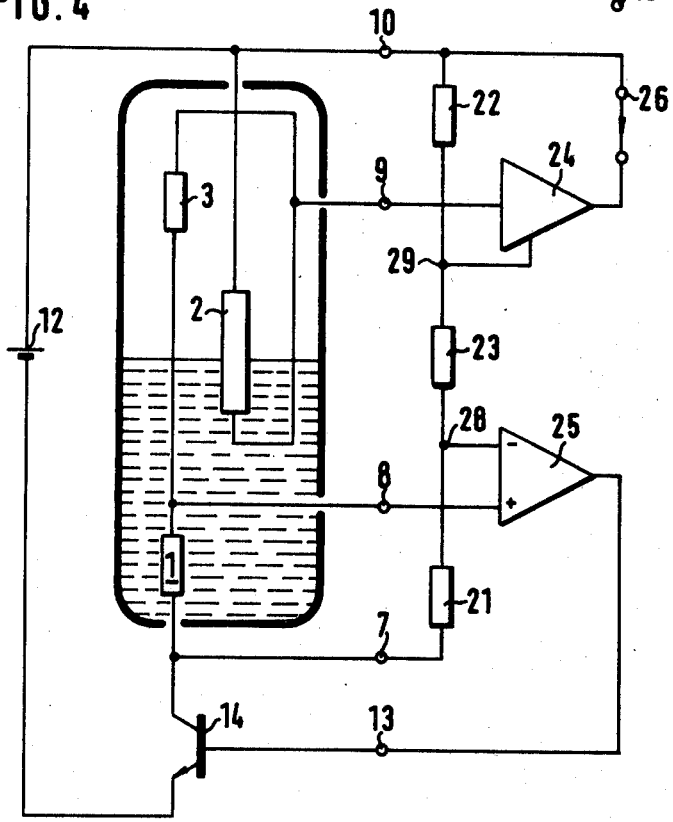

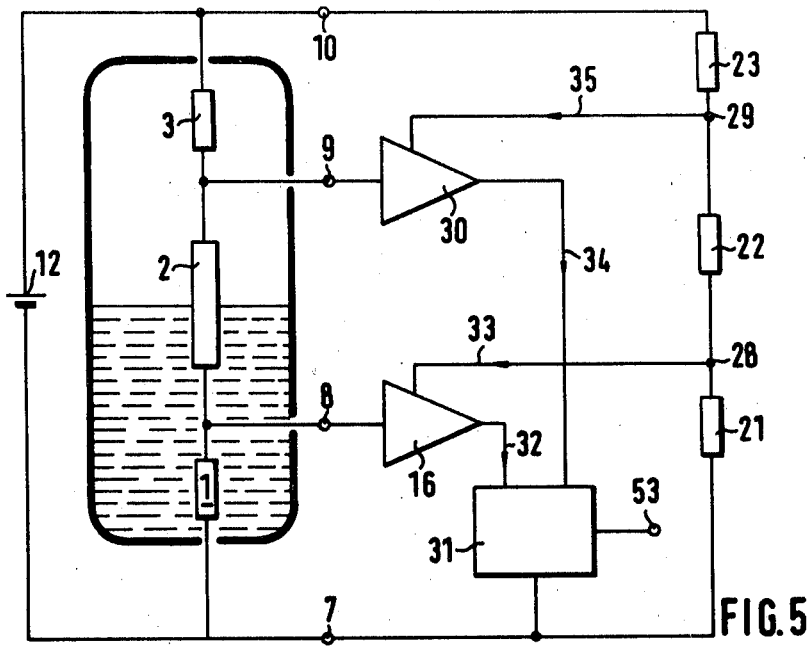
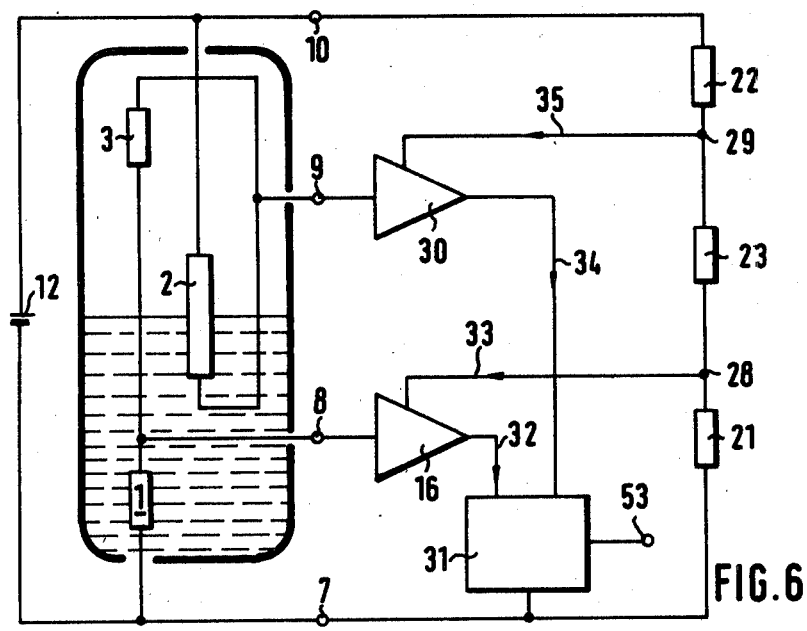

THERMOELECTRIC LEVEL MEASURING DEVICE

BACKGROUND OF THE INVENTION

The invention relates to a thermoelectric fill level measuring device having sensing resistors in a container with fill material and a free space.

Level measuring devices are required to monitor and control technical processes and are widely known. The serviceability of motor vehicles depends on sufficiently accurate display of the fuel supply state. Thermoelectric fill level measurement is an improvement on potentiometric level measurement because no moving parts are required and therefore it is possible to reduce the cost of manufacture and also provide high reliability. In contrast to dielectric fill level measurement, thermoelectric level measurement is virtually independent of any poor conductivity of the filling substance, as may occur in the case of ethanol, and is also virtually independent of any fluctuations in the composition of the fuel or filling material. A serious problem in thermoelectric level measurement is that of ensuring sufficient stability and accuracy.

Therefore it was proposed in German Auslegeschrift No. 2841889 to provide a second sensing resistor which was not heated and to evaluate the difference in the resistors. This solution does in fact provide for relatively accurate detection of the fill level when the container is full but there is inaccuracy of measurement as the level falls. However, in most applications it is desired to provide accurate display of the quantity remaining, as is the case for example with motor vehicles, since incorrect display of the fuel level may result in disastrous miscalculation of the distance which can be covered with the remaining fuel.

SUMMARY OF THE INVENTION

It is an object of the invention to provide a level measuring device which, respectively, indicates, as accurately as possible, the fill level of a liquid in a container, is simple in construction and can be manufactured at low cost.

According to a first aspect of the invention, there is provided a thermoelectric level measuring device for measuring the level of a material within a container which has a free space above the material, comprising a first sensing resistor for total immersion in the filling material, a second sensing resistor for partial immersion in said filling material and partial location in said free space, a third sensing resistor located totally in said free space, a series circuit comprising said first sensing resistor, said second sensing resistor and said third sensing resistor connected electrically in series and an evaluation circuit having inputs connected to the beginning and the end of said series circuit and to connection points between said resistors.

According to a second aspect of the invention, there is provided a thermoelectric level measuring device with sensing resistors in a container containing a filling material and a free space in which a first sensing resistor is surrounded by the fill material, a second sensing resistor is partly surrounded by the fill material and partly by the free space and a third sensing resistor is surrounded by the free space; the three sensing resistors are connected electrically in series and inputs of an evaluation circuit are connected to the series connection one at the beginning, one to the first connection point between said sensing resistors, one to the second connection point between said sensing resistors and one at the end thereof.

BRIEF DESCRIPTION OF THE DRAWINGS

The invention will now be described in greater detail, by way of example, with reference to the drawings in which:

FIGS. 3a and b show two amplification circuits which can be used in preferred manner in the evaluation circuit, FIG. 3c shows the symbol for the amplifying circuit;

FIG. 4 shows a more detailed embodiment of the level measuring device with a current controller;

FIG. 5 shows a form of level measuring device with a dividing circuit unit;

FIG. 6 shows a level measuring device with a different sequence of the sensing resistors;

DESCRIPTION OF THE PREFERRED EMBODIMENT

In a preferred embodiment of the invention, in a thermoelectric level measuring device of the type stated at the outset, a first sensing resistor is surrounded by the filling material, a second sensing resistor is surrounded partly by the fill material and partly by the free space and a third sensing resistor is surrounded by the free space the three sensing resistors being connected electrically in series and one input respectively of an evaluation circuit being connected to the beginning, to the first connection point, to the second connection point and to the end of the series connection.

The series connection of the three sensing resistors is connected to a supply voltage. A current controller is connected in series with the three sensing resistors, the control input of this current controller being connected to the evaluation circuit.

The sensing resistor with the mixed surroundings (e.g liquid surroundings and liquid free surroundings) is located in the series connection, preferably between the two other sensing resistors. A further series connection of three comparison resistors may be provided as well as the series connection of the sensing resistors. If the sensing resistor which is located in the filling material is designated the first sensing resistor and the sensing resistor with the mixed surroundings is designated the second sensing resistor and the sensing resistor in the free space is designated the third sensing resistor of the series connection, then the first comparison resistor is associated with the first resistor sensor, the second comparison resistor lying between the other two comparison resistors is associated with the second sensing resistor and the third comparison resistor is associated with the third sensing resistor sensor.

Figure 1:
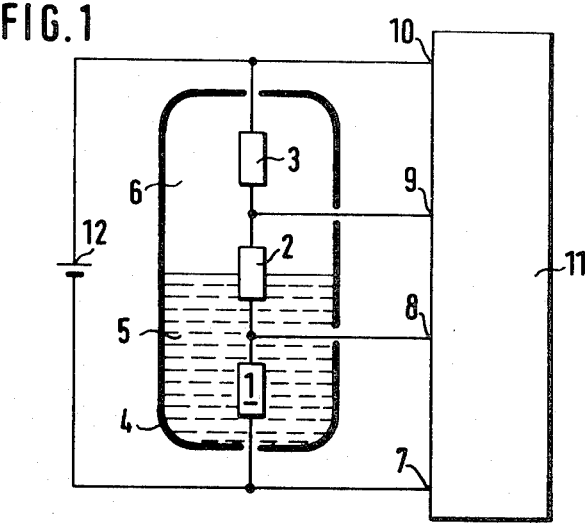
FIG. 1 shows the basic form of the thermoelectric level measuring device according to the invention.

Referring now to the drawings, a basic form of thermoelectric level measuring device in accordance with the invention comprises temperature dependent resistors 1,2,3, for example in the form of a metal layer on a carrier foil as shown in FIG. 1, these resistors being located in a container 4 having a filling material 5 and a free space 6 above the filling material. Suitable filling materials are liquids, more particularly fuels. Design features ensure that the first sensing resistor 1 is always in the filling material 5 regardless of the fill level of the filling material and the third sensing resistor 3 is always in the free space. The sequence of the sensing resistors within the series circuit may differ from that shown and depends on the requirements of the evaluation circuit.

Supply of electrical energy is provided by a voltage source 12. It is either connected, directly in accordance with FIG. 1 or via a current controller in accordance with FIG. 2 to the series connection of the sensing resistors. The rest of the circuit is referred to as the evaluation circuit 11 and its inputs 7 to 10 are connected to the beginning, end and first and second connection points of the series connection of the sensing resistors. If, in accordance with FIG. 2, a current controller 14 is provided, then the evaluation circuit has an output 13 for controlling the current controller.

Given that the currents for the evaluation circuit are negligible, the three sensing resistors have the same current passing through them, this current being delivered by the voltage source 12. The current results in heating of the three resistors. The degree of heating depends on the properties of the surroundings, more particularly the heat conductivity of the surroundings. In the normal case there is a higher temperature in the free space than in the filling material. There are changes in the resistance values in accordance with the heating and temperature coefficients, which is assumed to be the same for all three resistors. The largest relative change arises in the sensing resistor 3 in the free space and the smallest in the resistor 1 in the filling material. Sensing resistor 2, which is partly in the filling material and partly in the free space shows a relative change which is between the change in the first and third resistors.

Comparison of the changes from one to another in the evaluation circuit 11 is therefore able to give full information about the fill condition. In contrast to the arrangements according to the prior art, this information is independent of the magnitude of the supply voltage 12, the temperature coefficient of the sensing resistor, the surrounding temperature and also independent of the physical properties of the filling material because the reference information for "full" and "empty" is provided by the sensors 1 and 3.

The evaluation circuit 11 aims to determine the changes in the sensing resistors 1 to 3 as compared to the value before heating and also aims to form the measured variable therefrom. The relative change in one of the three sensing resistors arises from $A=(R_1-R_o)/R_o$, in which $R_1$ is the resistance value when there is current flow and $R_o$ is the cold resistance value. The measured variable F, which forms an indication of the fill level, is calculated at $F=(A_3-A_2)/(A_3-A_1)$, when $A_1, A_2, A_3$ are the relative changes associated with the first, second and third sensing resistors respectively. This formula indicates the two basic measurement processes used in the general circuits according to FIGS. 1 and 2. In both measurement processes, two electrical magnitudes are formed in the first instance corresponding to the differences $A_3-A_2$ and $A_3-A_1$ respectively. The measured variable is obtained therefrom in the general circuit according to FIG. 1 by division with the aid of a divider circuit. In the general circuit according to FIG. 2, the evaluation circuit includes a control circuit which stabilizes the difference $A_3-A_1$ by affecting the current controller 14. The difference $A_3-A_2$ can then be used immediately as a fill level signal.

A special amplifier circuit is preferred for fill level measuring devices according to the invention, the term current follower being used in the following for this. The amplifier circuit can, in accordance with FIG. 3a, be formed from an operational amplifier 16 with a field effect transistor 17 connected thereto. It is characterized by making the inverted input 19 assume approximately the potential applied to the noninverting input 18 by means of field effect transistor 17 and making a current supplied to the terminal 19 leave the circuit only via the terminal 20. Two bipolar transistors can also be used in accordance with FIG. 3b instead of the field effect transistor. In this case too, the incoming current is approximately equal to the outflowing current. The type of conductivity of the transistors used has to correspond to the current direction. The circuit symbol according to circuit 3c is used for the general diagram ((view)), in which the term "control input" or simply "input" is used for the terminal 18, sequence input is used for terminal 19 and output is used for terminal 20.

Figure 2:
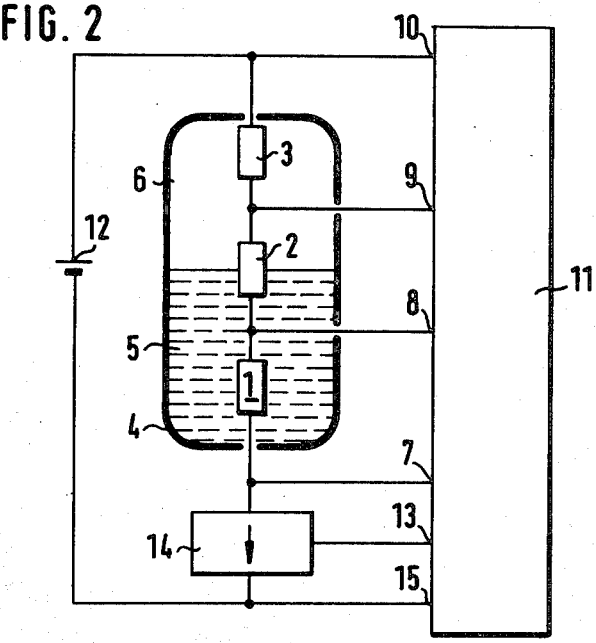
FIG. 2 shows the thermoelectric level measuring device with a current controller.

In FIG. 4, a preferred solution to the evaluation circuit for a level measuring device according to FIG. 2 is shown. The sensing resistors are arranged in the following sequence: Sensing resistor 1 for fill material, sensing resistor 3 for the free space and fill measuring sensing resistor 2. A series connection of three comparison resistors 21,23,22 is connected in parallel with the series connection of the sensing resistors. The control input of the current follower 24 is connected to the connection point 9 of the second and third sensing resistors 2,3 and the sequence input of the current follower 24 is connected to the connection point 29 of the second and third comparison resistors 22,23 while the output leads to a pair of output terminals 26. An operational amplifier 25 is connected by one input to the connection point 8 of the first and third sensing resistors 1,3 and by the other input to the connection point 28 of the first and third comparison resistors 21,23. A transistor is used as the current controller 14, its base being connected to the output 13 of the operational amplifier 25.

The evaluation circuit is preferably constructed so that the resistor ratios $R_3/R_{23}$ and $R_2/R_{22}$—this means the resistors associated with the position numbers and their cold resistance in the case of the sensing resistors—are equal to each other. The resistor ratio $R_3/R_{23}$ is smaller than the resistor ratio $R_1/R_{21}$ (when the temperature coefficient is positive) but when heated by the predetermined current they are the same. It is clear that due to the current controller 14, the operational amplifier 25 has such a current that the differential voltage of the connections 8 and 28 is negligably small. At this current, the predetermined increase in temperature is caused and therefore an increase is caused in the resistance of the sensing resistor 3 in the free space as compared to the sensing resistor 1 in the filling material. If the fill level is at a minimum and the sensing resistor 2 whose resistance is to be measured is completely in the free space, then all of the parts of this sensor experience the same increase in temperature as that of the sensing resistor 3. The resistor ratios $R_3/R_{23}$ and $R_2/R_{22}$ are then the same as each other as in the cold state, and amplifier 24 remains currentless. As the fill level increases, part of the sensing resistor is cooled and its resistance value is reduced. The voltage drop across the resistor decreases and at the same time the potential at the connection point 9 increases. The current follower 24 passes current to the connection point 29 until the potentials are approximately equal at the connection point 9. The current is proportional to the degree of covering of the sensing resistor 2. It is available at the pair of output terminals 26 as a measurement signal.

A fill level measuring device with a divider circuit is shown in FIG. 5. As in FIG. 4, a series connection of the comparison resistors is connected in parallel with the series connection of the sensing resistors. The supply voltage 12 is applied directly, however, without a current controller. A first current follower 16 tops the potential of the connection point 8 between the first and second sensing resistors 1, 2 and impresses it on the connection point 28 of the comparison resistors 21 and 22. This results in a current 20, 19 which is passed to the divider circuit 18 by current follower 16. Similarly, a second current follower 17 tops the potential of the connection point 9 between the second and third sensing resistors 2,3, and impresses it on the connection point 29 of the comparison resistors 22 and 23. This results in a current 25, 24 which is also passed to the divider circuit 18. The measurement signal is derived at the output 26 of the divider circuit 18.

Provision is made for the divider circuit 18 to perform the function $U_{26}=U_R \cdot I_{24}/(I_{24}+I_{19})$. Here $U_{26}$ is the output voltage, $U_R$ is a reference voltage, while $I_{19}$ and $I_{24}$ are the currents of the corresponding position numbers. The voltage of the supply source 12 is designated $U_{12}$. $R_{o1}, R_{o2}$ and $R_{o3}$ are the cold resistances of the sensing resistors 1,2 and 3. The relationships $R_1=R_{o1} \cdot b, R_2 =R_{o2} \cdot (x \cdot b+(1-x) \cdot a)$ and $R_3=R_{o3} \cdot a$ apply to the resistors $R_1$, $R_2$ and $R_3$. x is the relative fill level, a is the factor of the change in resistance in the free space and b is the factor of the change in the resistance in the filling material. $R_{21}$, $R_{22}$ and $R_{23}$ are the values of the comparison resistors 21, 22 and 23 respectively.

The ratios of the cold values of the sensing resistors to the comparison resistors would be equal, i.e. $R_{o1}/R_{21}=R_{o2}/R_{22}=R_{o3}/R_{23}$. The voltage drops across the sensing resistors are passed by the current follower to the reference resistors and the currents flowing therein are therefore determined as $I_{21}=U_{12} \cdot R_1/((R_1+R_2+R_3) \cdot R_{21})$, $I_{22}=U_{12} \cdot R_2/((R_1+R_2+R_3) \cdot R_{22})$ and $I_{23}=U_{12} \cdot R_3/((R_1+R_2+R_3) \cdot R_{23})$. From this the currents $I_{19}=I_{22}-I_{21}$ and $I_{24}=I_{23}-I_{22}$ are passed to the divider circuit. The relationship $U_{26}=x \cdot U_R$ is then obtained for $U_{26}$ under the conditions as previously mentioned. This relationship makes it clear that the output voltage $U_{26}$ is strictly proportional to the fill level without the supply voltage 12 or the factors of the increase in resistance (a,b) affecting the results.

As is apparent from this view, the divider circuit in FIG. 5 must form the sum $I_{24}+I_{19}$ before division. This may be avoided by the arrangement according to FIG. 6. If the construction is otherwise the same, the sequence of the sensing resistors is selected to be 1,3,2 and that of the reference resistors to be correspondingly 21,23,22. In this case the divider circuit 18 only has to carry out the function $U_{26}=U_R \cdot I_{24}/I_{19}$.

Figure 7:
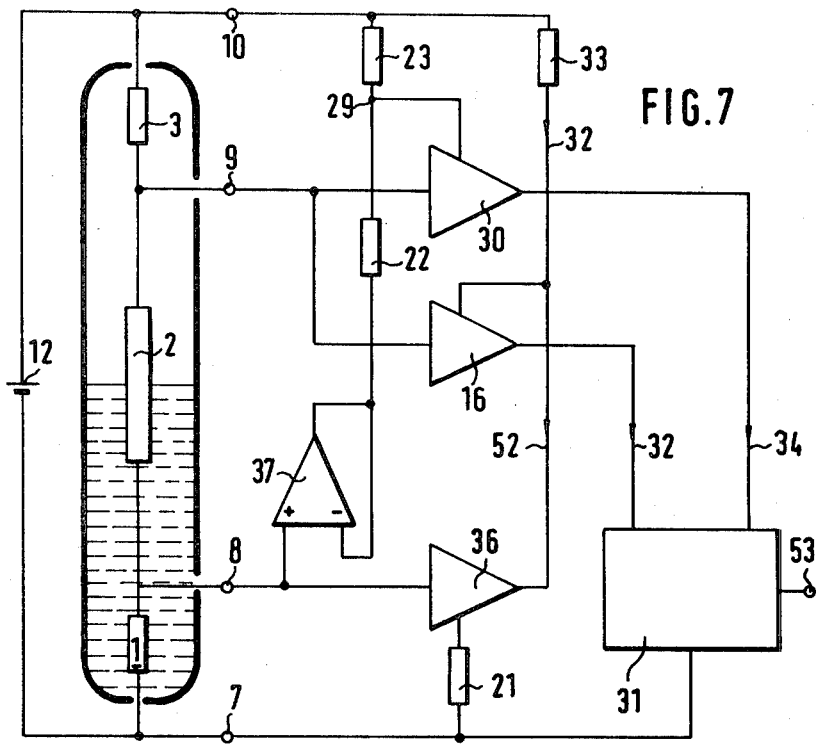
FIG. 7 shows a level measuring device for small voltage drops across the sensing resistors on the filling material and the free space, and, FIG. 8 shows an example of the dividing circuit unit suitable for use in the embodiment of FIG. 5.

In view of design considerations, it may be necessary to make the sensing resistor 1 and 3 for the filling material and the free space relatively small in relation to the measuring resistor 2. The voltage drops across these resistor sensors are then correspondingly small. In a circuit according to FIG. 5 or 6, this means that, particularly in case of the current follower 16, the operating voltage for the output transistors shown in FIG. 3 is insufficient. This difficulty is overcome by the circuit according to FIG. 7. Here the sensing resistors are arranged as in FIG. 5. The operational amplifier 37, connected as a voltage follower, and the input of the current follower 36 are connected to the connection point 8. The comparison resistor 21 is connected between point 7 and the sequence input of the current follower 26. The series connection of the comparison resistors 22 and 23 lead from the output of the voltage follower 37 to the point 10; the sequence input of the current follower 17 is connected to the connection point 29 of the comparison resistors 22 and 23. The inputs of the current followers 16 and 17 are connected to the connection point 9. A fourth comparison resistor 33, which is normally equal to the third comparison resistor 23, leads from the point 10 to the sequence input of the current follower 16 which is connected to the output of the current follower 36. The outputs of the current followers 16 and 17 lead to the divider circuit 18.

If the comparison resistors are large in relation to the measuring resistors, then the operational amplifier 37 which is connected as a voltage follower is dispensed within the circuit arrangement described. The comparison resistor 22 associated with the second sensing resistor 2 is connected directly to the connection point 8 of the first and second sensing resistors 1,2.

The voltage drop across the third sensing resistor 3 is fed to the comparison resistor 33 by the current follower 16 and a suitable current 32 is triggered. The current follower 36 transmits the voltage drop across the first sensing resistor 1 to the related comparison resistor 21 and the resultant current 30 is subtracted from the current 32. The current difference is passed to the divider circuit as an output current 19 from the current follower 16; it represents the dividing signal. The counting or multiplying signal produced with the aid of the current follower 17 is largely the same as that of the circuit of FIG. 5. In this form of the solution, the amplifiers either remain operational or the amplifiers can be considered to be operational even if the voltage drops across the resistor sensors are relatively small.

Figure 8:
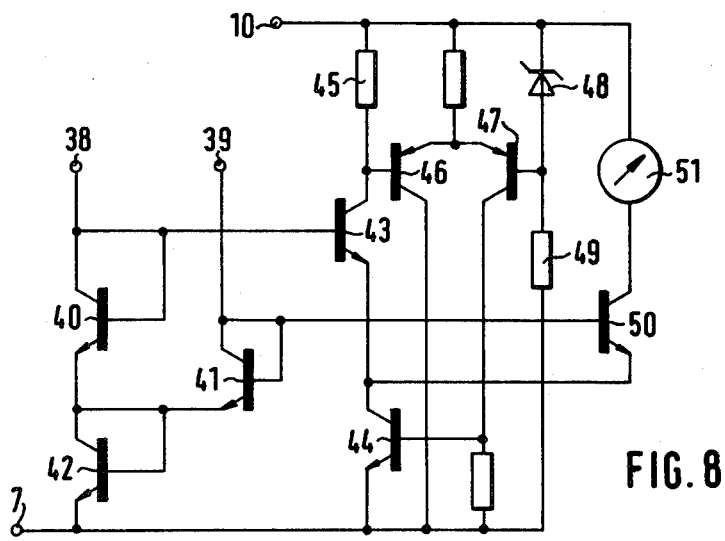

Finally, FIG. 8 shows a preferred embodiment of the divider circuit. The two output currents 19 and 24 are supplied to the input 38 and 39 and pass through the transistors 40 and 41 which are connected as diodes. The voltage drops across the transistors are logarithmically dependent on the current. The voltage difference between the connections 38 and 39 is therefore only a function of the ratio between the inflowing currents. The voltage difference is supplied to a pair of transistors 43, 50. The current through the transistor 43 is stabilized by a control loop with a zener diode 48 and the transistors 44, 46 and 47. Since the currents in the transistors 50 and 43 are in the same ratio as the currents in the transistors 41 and 40, the current in the transistor 50 responds to the desired measured value and can be indicated in the ammeter 51.

Unavoidable tolerances in the manufacture of the sensing resistors and comparison resistors may require adjustment of the arrangement. The aim of the adjustment will be to make the ratios of the three cold sensing resistors to their corresponding comparison resistors equal. For this, two adjustments are necessary, since one of the ratios can be used as a desired value for the other two.

The adjustment may be implemented for example by the use of variable resistors. If the comparison resistors are part of an integrated circuit, then a set of preferably two-stage adjusting resistors, also part of an integrated circuit, may be used for adjustment. The adjustment procedure consists of determining the most advantageous combination of adjusting resistors and connecting them up to the comparison resistor.

It will be understood that the above description of the present invention is susceptible to various modifications, changes and adaptations.

What is claimed is:

1. A thermoelectric level measuring device for measuring the level of a material within a container which has a free space above the material comprising: three sensing resistors connected electrically in a series connection and disposed in the container, said series connection presenting a beginning, an end, and first and second connection points between said sensing resistors, with a first one of said sensing resistors being surrounded by the material, a second one of said sensing resistors being partly surrounded by the material and partly by the free space and a third one of said sensing resistors being surrounded by the free space and arranged between said first sensing resistor and said second sensing resistor of said series connection; and an evaluation circuit having inputs connected to said series connection, one at the beginning of said series connection, one to said first connection point between said sensing resistors, one to said second connection point between said sensing resistors and one at said end.

2. A device as defined in claim 1, and further comprising a supply voltage source connected to said series connection of said three sensing resistors.

3. A device as defined in claim 1, further comprising a current controller connected in series with said three sensing resistors and having a control input connected to said evaluation circuit.

4. A thermoelectric level measuring device for measuring the level of a material within a container which has a free space above the material comprising: three sensing resistors connected electrically in a series connection and disposed in the container, said series connection presenting a beginning, an end, and first and second connection points between said sensing resistors, with a first one of said sensing resistors being surrounded by the material, a second one of said sensing resistors being partly surrounded by the material and partly by the free space and a third one of said sensing resistors being surrounded by the free space; and an evaluation circuit having inputs connected to said series connection, one at the beginning of said series connection, one to said first connection point between said sensing resistors, one to said second connection point between said sensing resistors and one at said end, and a series connection of first, second and third comparison resistors connected in parallel with said series connection of said sensing resistors with said first comparison resistor associated with said first sensing resistor, said third comparison resistor associated with said third sensing resistor and said second comparison resistor associated with said second sensing resistor.

5. A device as defined in claim 4, wherein, said evaluation circuit further includes an operational amplifier having a first input connected to said first connection point of said sensor resistors, a second input connected to a first connection point of said comparison resistors, and an output; and said device further comprises a current controller having an input connected to said operational amplifier output.

6. A device as defined in claim 4, wherein said evaluation circuit, further includes a current follower having a control input connected to said second connection point of said sensing resistors, a sequence input is connected to a second connection point of said comparison resistors, and an output leading to a pair of output terminals for connection to further devices for display, amplification or signal processing.

7. A device as defined in claim 4, wherein at least one of said comparison resistors is adjustable.

8. A device as defined in claim 7 wherein said at least one comparison resistor to be adjusted comprises a main resistor and a set of two-stage resistors connected to the main resistor in the required combination during the adjusting process.

9. A thermoelectric level measuring device for measuring the level of a material within a container which has a free space above the material comprising: three sensing resistors connected electrically in a series connection and disposed in the container, said series connection presenting a beginning, an end, and first and second connection points between said sensing resistors, with a first one of said sensing resistors being surrounded by the material, a second one of said sensing resistors being partly surrounded by the material and partly by the free space and a third one of said sensing resistors being surrounded by the free space; and an evaluation circuit including: inputs connected to said series connection, one at the beginning of said series connection, one to said first connection point between said sensing resistors, one to said second connection point between said sensing resistors and one at said end; a series connection of three comparison resistors connected in parallel with the series connection of said three sensing resistors; a first current follower having a control input connected to said first connection point of said sensing resistors and a sequence input connected to a first connection point of said comparison resistors; a second current follower having a control input connected to said second connection point of said sensing resistors, a sequence input connected to a second connection point of said comparison resistors and an output; and a divider circuit connected to the output of said second current follower.

10. A device as defined in claim 9, wherein at least one of said comparison resistors is adjustable.

11. A device as defined in claim 10 wherein said at least one comparison resistor to be adjusted comprises a main resistor and a set of two-stage resistors connected to the main resistor in the required combination during the adjusting process.

12. A thermoelectric level measuring device for measuring the level of a material within a container which has a free space above the material comprising: three sensing resistors connected electrically in a series connection and disposed in the container, said series connection presenting a beginning, an end, and first and second connection points between said sensing resistors, with a first one of said sensing resistors being surrounded by the material, a second one of said sensing resistors being partly surrounded by the material and partly by the free space and a third one of said sensing resistors being surrounded by the free space; and an evaluation circuit including: inputs connected to said series connection, one at the beginning of said series connection, one to said first connection point between said sensing resistors, one to said second connection point between said sensing resistors and one at the said end; first and second current followers having respective control inputs connected to said second connection point of said sensing resistors, respective sequence inputs and outputs; a third current follower having a control input connected to said first connection point of said sensing resistors, a sequence input and an output; an operational amplifier connected as a voltage follower and having an input connected to said first connection point of said sensing resistors and an output; a first comparison resistor leading from said beginning of said series connection of said sensing resistors to the sequence input of said third current follower; a second comparison resistor leading from the output of said voltage follower to the sequence input of said second current follower; a third comparison resistor leading from said sequence input of said second current follower to said end of said series connection of said sensing resistors; a fourth comparison resistor connected to said end of said series connection of said sensing resistors, with the output of said third current follower connected to the sequence input of said first current follower and to said fourth comparison resistor; and a divider circuit connected to the outputs of said first and second current followers.

13. A device as defined in claim 12 wherein said second comparison resistor is connected to said first connection of said sensing resistors.

14. A device as defined in claim 12 wherein at least one of said comparison resistors is adjustable.

15. A device as defined in claim 14 wherein said at least one comparison resistor to be adjusted comprises a main resistor and a set of two-stage resistors connected to the main resistor in the required combination during the adjusting process.

* * * * *